United States Patent [19]

Watson

[11] 4,182,451
[45] Jan. 8, 1980

[54] CONTAINER LEVEL HEIGHT DETECTOR

[75] Inventor: Harold K. Watson, San Francisco, Calif.

[73] Assignee: Specialty Brands, Inc., San Francisco, Calif.

[21] Appl. No.: 910,770

[22] Filed: May 30, 1978

[51] Int. Cl.² .............................................. B07C 5/342
[52] U.S. Cl. .................................. 209/524; 250/223 B
[58] Field of Search .............. 73/290; 250/223 B, 577; 209/524, 525

[56] References Cited

U.S. PATENT DOCUMENTS

| 2,841,011 | 7/1958  | Mayes et al.  | 73/749    |
| 2,982,862 | 5/1961  | Smith         | 250/223 B |
| 3,001,076 | 9/1961  | Crump .       |           |
| 3,091,368 | 5/1963  | Harley        | 250/223   |
| 3,094,214 | 6/1963  | Wyman         | 250/223 B |
| 3,404,282 | 10/1968 | Walker .      |           |
| 3,697,754 | 10/1972 | Maxwell .     |           |
| 3,702,625 | 11/1972 | Schmidt .     |           |
| 3,796,873 | 3/1974  | Ledgett .     |           |
| 3,818,232 | 6/1974  | Kirkpatrick . |           |
| 3,821,558 | 6/1974  | Mansfield .   |           |

OTHER PUBLICATIONS

Liquid Level Inspection for Food Processing, An advertising brochure of Industrial Dynamics Co. Ltd., 2927 Lomita Blvd., Torrance, CA.
Icor Systems Check, Detect, Inspect, Sort & Control, An advertising brochure of Icore, 485 Clyde Ave., Mountain View, CA.

Primary Examiner—S. Clement Swisher
Attorney, Agent, or Firm—Limbach, Limbach & Sutton

[57] ABSTRACT

A radiation beam that passes through a container but which is severely attenuated or blocked by particulate material within the container is scanned across a container at a desired top layer of particulate material. Radiation emerging from the container during the scanning is detected as to intensity level. Alternatively, a radiation beam is reflected from the material to a detector. The intensity level is sampled at periodic intervals during the scan to determine at periodic positions across the container whether the height of the material therein is above or below the desired fill level. The proportional number of points that are above and below the fill level are compared to a desired threshold for either accepting the container as properly filled or rejecting it as improperly filled.

15 Claims, 9 Drawing Figures

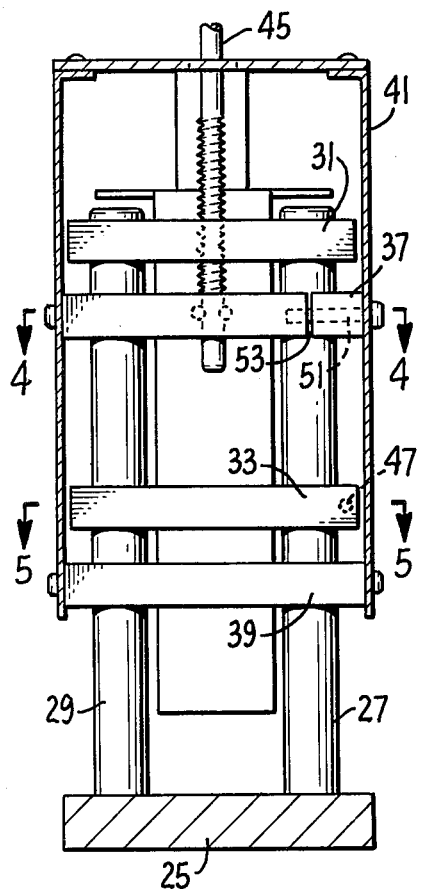
FIG.3.
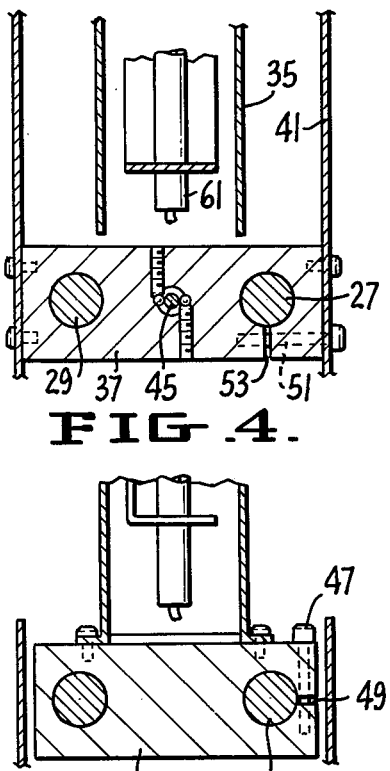
FIG.4.
FIG.5.
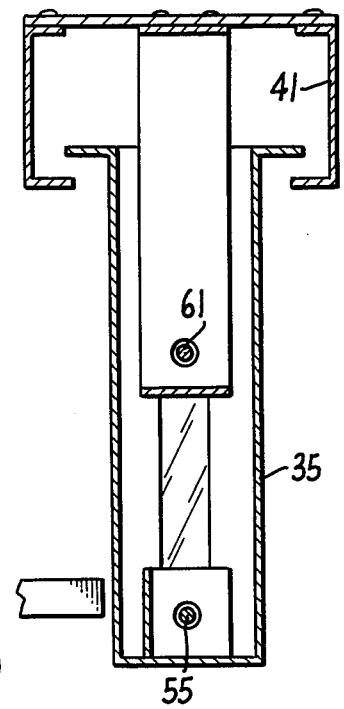
FIG.6.
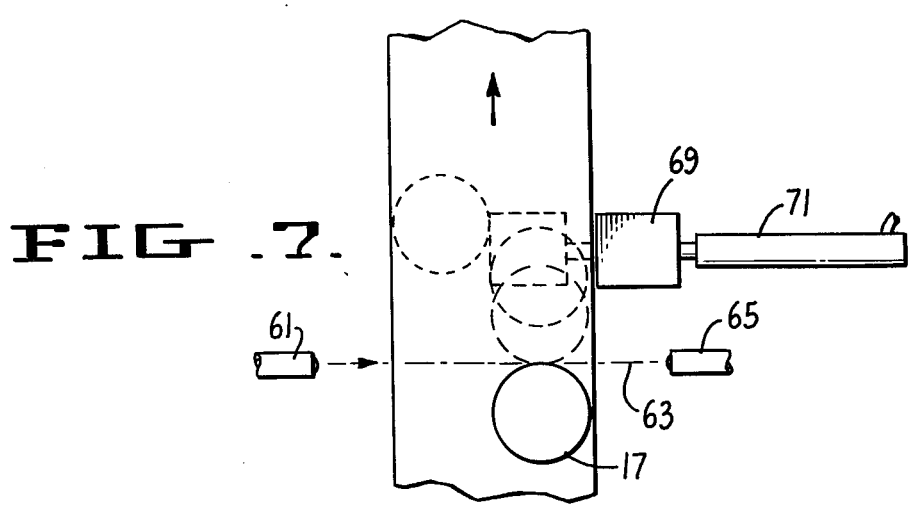
FIG.7.

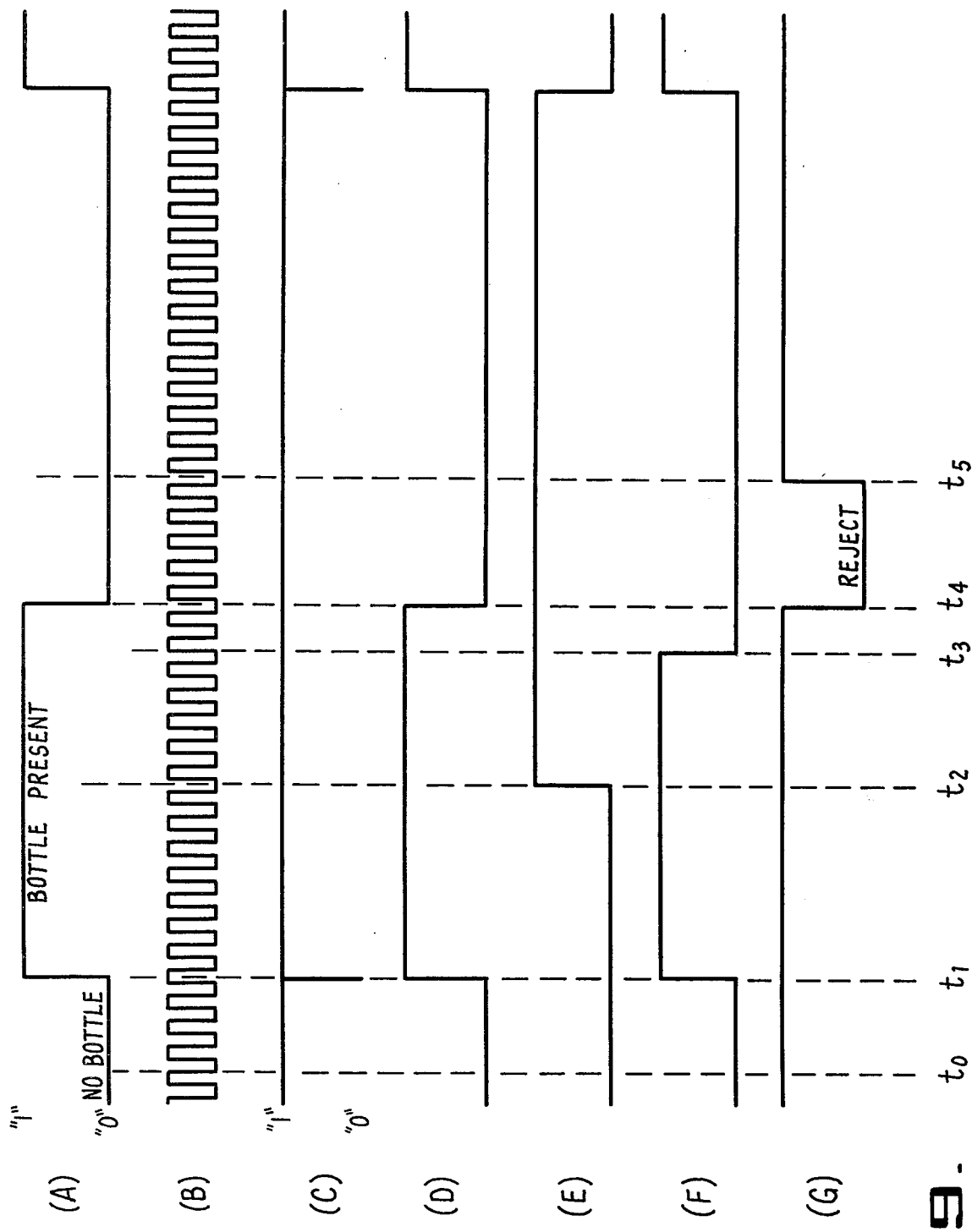

CONTAINER LEVEL HEIGHT DETECTOR

BACKGROUND OF THE INVENTION

This invention relates generally to the art of nondestructive measurement, and more particularly to the art of measuring the level of solid, dry particles within a container.

A principal use of a level detection system is in the art of packaging. The amount of material that is to be placed into a container is often times measured by the height of that material within the container, rather than by weight or by other measures. Such is often the case in the package food industry. The determination of a fill level for dry, solid pieces or particles to be packaged is difficult because of a varying surface height. Therefore, it is a principal object of the present invention to provide a method and apparatus for determining the position of a rough top surface of container contents.

SUMMARY OF THE INVENTION

Briefly, this and other objects of the present invention are accomplished by a technique wherein a radiation beam to which the container is transparent but to which its contents are opaque is scanned across the container near its top where the top or fill line of the contents is desired to be, and the transmitted radiation is detected. Alternatively, a radiation beam to which the container is transparent but to which its contents are reflective is scanned and the reflected radiation is detected. As the beam is scanned in either case, its intensity is periodically sampled to determine at the sample times whether the beam has encountered container material or not. The relative proportion of the samples of detected low and high radiation intensity are compared with a threshold to determine if the level of the container's contents is within acceptable limits.

This aspect of the present invention is described hereinafter with respect to a continuous process method and machine wherein a line of transparent containers are moved pass a detection station and through an electromagnetic radiation beam within the visible or near visible (such as infra-red or ultraviolet wavelengths) radiation spectrum. Additional objects, advantages and features of the present invention are described with respect to that preferred embodiment which should be taken in conjunction with the accompanying drawings.

BRIEF DESCRIPTION OF THE DRAWINGS

FIG. 3 is a sectional view of the apparatus of FIGS. 1 and 2 taken at section 3—3 of FIG. 2;

FIG. 4 is a sectional view of the apparatus of FIGS. 1-3 taken at section 4—4 of FIG. 3;

FIG. 5 is a sectional view of the apparatus of FIGS. 1-4 taken at section 5—5 of FIG. 3;

FIG. 6 is a sectional view of the apparatus of FIGS. 1-5 taken at section 6—6 of FIG. 2;

FIG. 7 is a view of the apparatus of FIGS. 1-6 as viewed from section 7—7 of FIG. 2;

FIG. 9 is a timing diagram of the electronic circuit of FIG. 8.

DETAILED DESCRIPTION OF THE PREFERRED EMBODIMENTS

Figure 1:
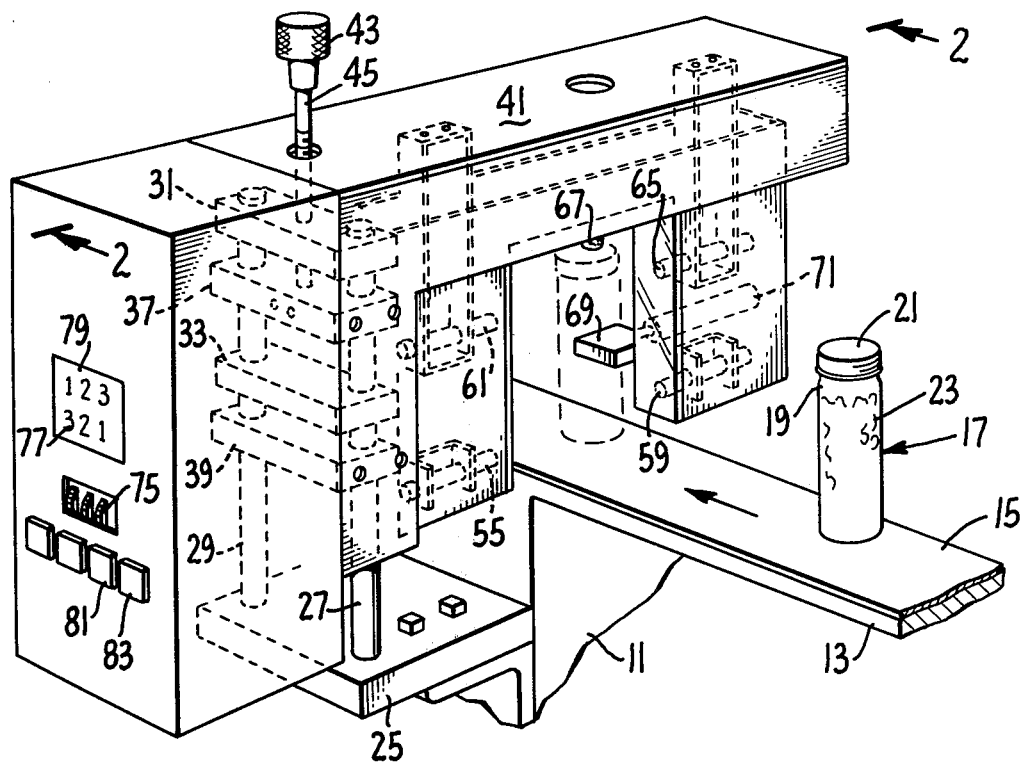
FIG. 1 is a prospective view of an apparatus adapted to carry out the present invention.

The present invention, in its broadest aspects, can be carried out by a number of different systems and specific instruments. The system being described with respect to the drawings is just one of those instruments. But this instrument is constructed in a way that itself is unique. For convenience, the instrument will be described separately with respect to its mechanical and electrical properties.

Mechanical Structure

The mechanical structure is shown in detail in FIGS. 1-6. A base structure 11 is held solid on a building floor, table or the like. The base includes a support 13 for a moving belt 15. The belt 15 is caused to move in a direction toward the machine by some convenient motor source (not shown). Carried on the right side of the belt 15 are containers 17 that include a glass base 19 and a metal lid 21. Solid, dry particles 23 are packed into the jar 17. Such material may be, for instance, granulated spices packaged in small bottles for the ultimate consumer.

The base 11 also includes a plate 25 rigidly attached thereto. Vertical, round metal posts 27 and 29 are fixed at their bottom end to the plate 25. The posts 27 and 29 carry two sets of blocks that are slidable up and down the post. A first set of blocks 31 and 33 are fixed to an internal housing assembly 35. The other two blocks 37 and 39 are fixed to an outer housing assembly 41.

For reasons explained hereinafter, the housing assemblies 35 and 41 are made to be vertically adjustable with respect to the fixed frame 11 and with respect to each other. All of these adjustments are made by rotating a knob 43 which is fixed to a threaded shaft 45. The shaft 45 threadedly engages the block 31. A lower end of the shaft 45 is rotatably held to the block 37 by a ball socket that is characterized by permitting rotation of the shaft 45 with respect to the block 37 while preventing axial movement with respect thereto.

The blocks 31 and 39 are freely movable up and down along the posts 27 and 29. Each of the blocks 33 and 37, however, may be clamped to the post 27 to prevent such movement. This is accomplished by a screw 47 which can be adjusted to control the width of a slot 49 in the block 33, thereby controlling the amount of grip of the block on the post 27. Similarly, a screw 51 is provided within the block 37 across a slot 53 in the block.

In operation, therefore, it can be seen that if the screw 51 is tightened to affix the block 37 to the post 27, the outer housing assembly 41 will be fixed to the base of the machine. If the screw 47 is loosened to permit the block 33 to slide along the post 27 at the same time, rotation of the knob 43 causes the blocks 31 and 33 to move along the posts 27 and 29, thus also moving the inner housing assembly 35 to which the blocks are attached. Conversely, if the screw 47 is tightened but the screw 51 is loosened, rotation of the knob 43 causes the blocks 37 and 39 to move along the posts 27 and 29, thus moving the outer housing 41 to which they are attached.

The principal reasons for providing the rel 'ive adjustments just described is for providing positional adjustments of radiation emitters and detectors with respect to the belt 15. A source 55 of a radiation beam 57 is carried by the inner housing 35. The beam 57 traverses the detection station over the belt 15 to strike a radiation detector 59 carried by an opposite leg of the inner housing 35. A second source 61 of a second radiation beam 63 is carried by the outer housing 41, with a radiation detector 65 positioned to receive the radiation beam 63 after it has traversed a distance over the belt 15. The radiation detector 65 is also attached to the outer housing 41.

In the particular example being explained, the radiation utilized is electromagnetic radiation within the visible or near visible spectrum since the container for which the instrument described is particularly adapted is substantially transparent glass and its contents 23 are opaque and block the transmission of light. In this example, the radiation sources 55 and 61 are preferably light emitting diodes in the infrared region and the detectors 59 and 65 are phototransistors. For other types of containers and contents, such as a container that is opaque to the transmission of light, other radiation types need to be used, such as x-radiation, gamma radiation, laser and so forth.

The lower source 55 and detector 59 are simultaneously adjusted in height through the screw knob 43 by adjusting the position of the inner housing 35. For a particular type of bottle 17 to be monitored, these elements are placed so that the narrow radiation beam 57 goes through the glass base of the bottle 17 to be significantly attenuated by the time it reaches the detector 59. The lower source and detector pair are provided to detect when a bottle is within the detecting station, as described more fully hereinafter.

Figure 2:
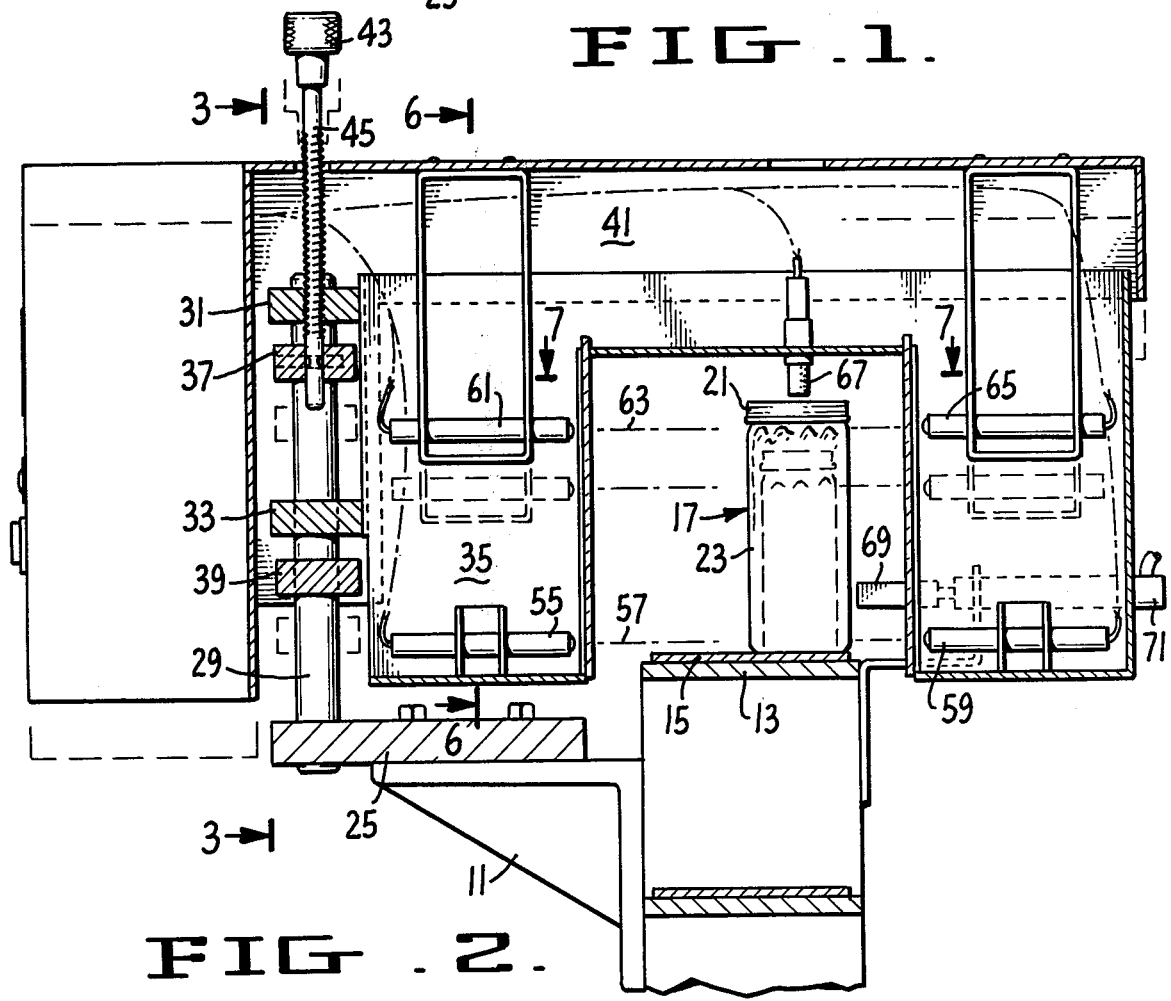
FIG. 2 is a sectional view of the apparatus of FIG. 1 taken at section 2—2 thereof.

The upper source 61 and the detector 65 are adjusted through the screw 43 by moving the outer housing 41 up and down until its radiation beam 63 is positioned to impinge on the bottle 17 at its desired top fill level. FIG. 2 illustrates such a position for the bottle 17. For a smaller bottle, as shown in dotted outline in FIG. 2, the source 61 and detector 65 are lowered, as also shown in dotted outline in FIG. 2, to the desired fill level for that smaller bottle. The belt 15 moves the bottle 17 through both of the radiation beams 57 and 63, preferably at a uniform speed. Of course, other arrangements can be implemented for carrying out the broad aspects of the present invention, such as by holding the bottle 17 stationary and scanning the radiation beam 63 across the bottle at the desired fill level. The detectors and radiation sources are positioned in a manner that the beams 57 and 63 travel across the belt 15 in a plane that is perpendicular to that of the belt 15.

The instrument being described examines the bottle 17 for the proper fill level as it passes through the detection station, and also determines whether a metal cap 21 exists on the bottle, through a cap detector 67 that changes an electrical characteristic when the metal cap is in its vicinity. If either the fill level of the contents within the bottle 17 is below a particular level, as detected by the beam 63; or if no cap exists, as detected by the detector 67, then a diverting bar 69 operates to move the bottle out of the main stream of those flowing through the device.

The operation of the diverting bar 69 is best illustrated in FIG. 7. Bottles normally travel on the right side of the belt 15 but after passing through the beam 63 will be diverted to the left hand side of the belt if the bottle does not pass the test of the detection station. The bar 69 is moved with the aid, in this specific example, of an air cylinder 71 that is controlled by an electric solenoid valve. If a bottle passes the test, it is then permitted to continue to travel on the right side of the belt 15 and is packaged for shipment. The rejected bottles on the left hand side of the belt are subsequently diverted off the belt by suitable equipment (not shown) in order to prevent them from being shipped.

The instrument being described also contains certain controls and indicators, as best illustrated in FIG. 1. A three digit thumb wheel switch 75 permits the operator to set the threshold level below which a bottle is rejected for insufficient material therein. First and second digital displays 77 and 79 are provided for giving the operator information, after a bottle has passed through the detecting station, as to how close the level of the material therein was to the desired level. Various push button control switches and indicating lights are also provided, including a light 81 which comes on after a bottle has failed the cap test, and a light 83 which comes on after the bottle has failed the fill level test.

Electronic System

Figure 8:
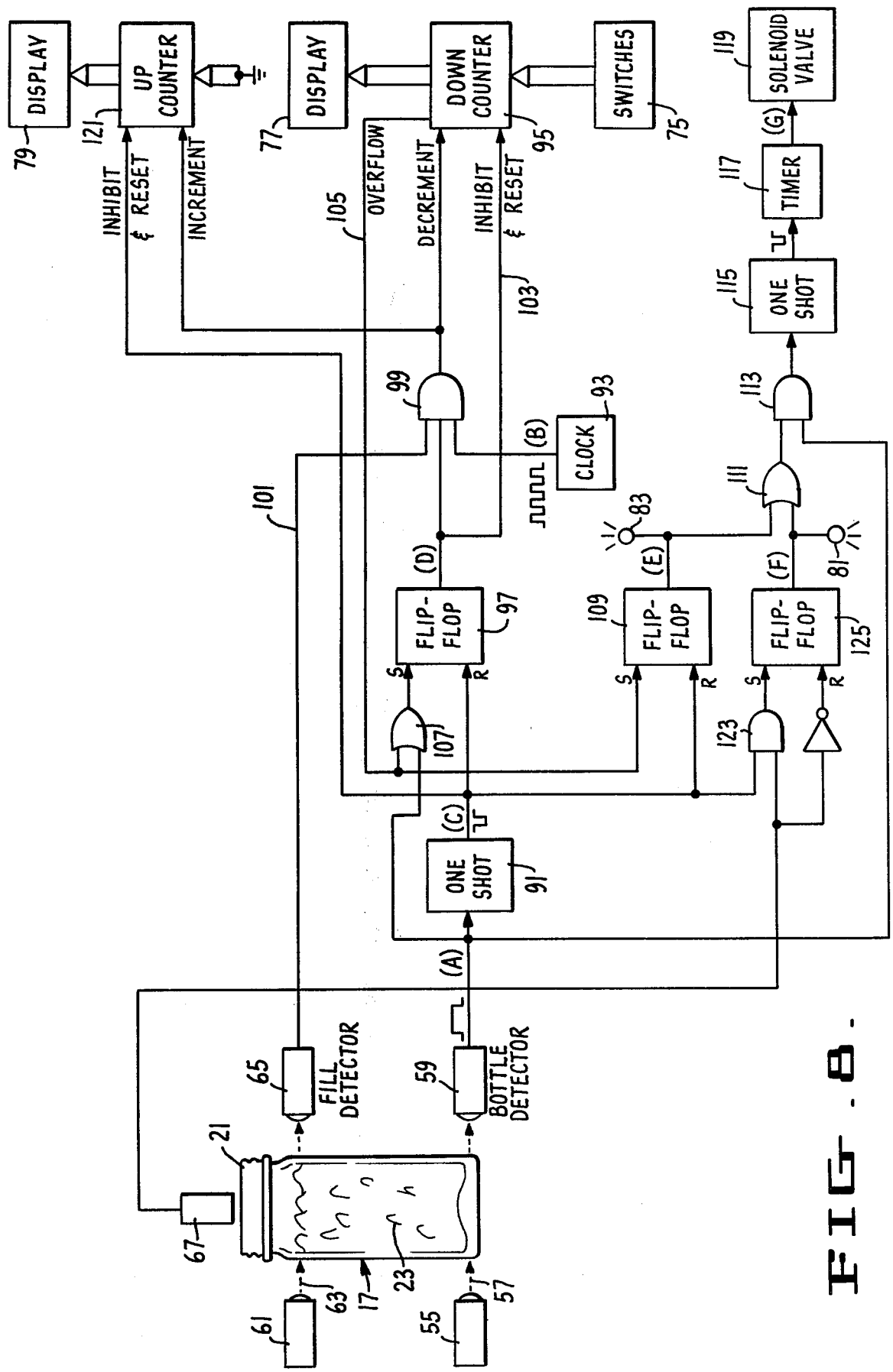
FIG. 8 is a block diagram of an electrical circuit utilized in connection with the apparatus illustrated in FIGS. 1-7.

FIG. 8 illustrates in block diagram form an electronic schematic diagram for a system to automatically determine whether a given bottle passes or fails the fill level cap test. The circuit of FIG. 8 should be reviewed in connection with the voltage waveforms of FIG. 9, wherein waveform 9(A) occurs at line (A) of FIG. 8, a so forth.

The lower detector 59 gives a signal indicated at FIG. 9(A) showing the presence of the bottle within the detecting station. This signal is applied to a one shot multivibrator 91 whose output is shown in FIG. 9(C), being a short duration, single pulse. FIG. 9(B) shows the output of a clock oscillator 93. For reasons explained hereinafter, the speed of the belt 15 is coordinated with the frequency of the clock signal and the size of the bottles being examined so that there are a large number of clock pulses between times t1 and t4 of FIG. 9 wherein the bottle is present within the detecting station, preferably over 100 clock pulses and higher. The duration of the pulse output of the one shot 91, as shown in FIG. 9(C), is preferably only a small fraction of the duration of one period of the output of the clock oscillator 93.

A principal goal of the circuit of FIG. 8 is to take many samples of the radiation falling on the detector 65 at periodic intervals and then to keep track of the total proportion of samples for a given bottle that are either low because the radiation is blocked by the particulate material 23 within the bottle, or high if the beam 63 is passing through the bottle over the particulate material. The samples are taken by the output of the clock oscillator 93 and are kept track of by a down counter 95 that is decremented by the clock oscillator output. The counter 95 is decremented, however, only if the bottle detector 59 detects the presence of a bottle within the detecting station. This is accomplished by applying the output of the one shot 91 to a reset input of a flip-flop 97 whose output, having a waveform shown in FIG. 9(D) is applied to one input of an AND gate 99. The clock oscillator 93 is applied to another input of the AND gate 99, whose output is connected to the clock input of the counter 95. A third line 101 input to the AND gate 99 is the output of the fill detector 65, connected in this particular embodiment so that the clock pulses 93 can get through to decrement the counter 95 only when the detector 65 receives the high intensity level indicative of no material being present in the beam radiation beam 63.

Because the speed of the belt is uniform and known, and the size of the bottle is known, the frequency of the clock oscillator 93 is set to a known value to take a desired number of samples as the bottle passes through the detecting station. The instrument operator decides how many of those samples that will be permitted to show no material in the pass of the beam 63 before the bottle is rejected. This is accomplished by the operator setting the switches 75 to such a number. The switches 75 are connected to the counter 95 so that upon a proper signal in the line 103 connected to the counter 95, the counter will be reset to the value dialed into the switches 75. The counter 95 is decremented one value upon the occurrence of each clock pulse when a bottle is within the detecting station if the detector 65 detects no material present in the bottle at that position. If material is present; the output of the detector 65 is such as to prevent the clock pulse 93 from passing through the AND gate 99 and on to the counter 95. When the counter has received a number of such "no material" clock pulses that is equal to the number dialed into the switches 75, an overflow signal occurs in a line 105 which indicates that the bottle has failed the fill test. Such a signal is connected back through an OR gate 107 to set the flip-flop 97 when it occurs. Also connected to the OR gate 107 is the output of the bottle detector 59. Operation of this part of the circuit can be understood best by referring to FIG. 9(D) which is the output of the flip-flop 97. At time t4 the flip-flop 97 is set by the drop in signal level from the bottle detector 59 being applied through the OR gate 107 to the flip-flop 97. This then blocks the clock signal from going through the AND gate 99 to the counter 95 until a new bottle appears in the detecting station to break the bottle detecting radiation beam 57. The flip-flop 97 can be reset sooner, however, such as at time t2 of FIG. 9(D), if the counter 95 emits an overflow pulse in the line 105. The overflow signal in the line 105, indicative of a bottle failing the fill test, is also applied to a set input of a flip-flop 109 whose output is shown by FIG. 9(E). As a new bottle enters the detection station, the flip-flop 109 is reset by connection thereto from the output of the one shot 91. Only if a bottle fails the fill test does the flip-flop 109 become set, its output connected through appropriate drivers to a fill level fail light 83. When the flip-flop 109 is in its "fail" condition, this is communicated through an OR gate 111 and an AND gate 113 to a one shot multi-vibrator 115 whose momentary output initiates a timing circuit 117. The timing circuit 117 energizes a solenoid valve 119 for a time which causes air to be applied to the air cylinder 71 to push the bar 69 against the bottle that has failed in order to move it to the left side of the belt 15. The time that the valve 119 is held open is made to be just long enough to move the bottle and to permit retraction of the bar 69 after that time period to avoid hitting a subsequent bottle being moved by the belt 15.

The display 77 shows the count in the counter 95 at all times. Counter 95 is always enabled to receive clock inputs. At t0, 103 is low which reloads the value specified by the switches 75. The counter is inhibited from decrementing transitions on the clock line as long as 103 is low. At t1 when the signal level in the line 103 goes high, the counter is released to decrement transitions on the clock line until the signal in the line 103 again goes low either by the counter 95 being counted all the way down to zero and emitting an overflow signal in line 105, or by the bottle departing the detection station. In either case when 103 goes low, the value specified by the switch 75 is reloaded into the counter 95 and displayed on 77.

As an additional aid to an operator, an up counter 121 is optionally provided with its count being displayed in the display 79. The counter 121 is incremented for each clock pulse that passes through the AND gate 99. The counter 121 is reset by connection of its reset terminal to the output of the one shot 91. Thus, as a bottle first enters the detection station, the up counter is reset to an initial value, in this case zero since its appropriate terminals are connected to ground potential. The display 79 is thus a further aid to the operator to determine the number of samples wherein no particulate material was observed by the fill level radiation beam 63.

A comparison of the display 79 (a reading of the last container) with display 77 (the reject limit) provides the operator with the proximity of the fill level with the rejection limit.

The cap detection aspect of the instrument is integrated with the fill level detection scheme to the extent of alternatively causing the solenoid valve 119 to operate to push a bottle out of the way if no cap is present. The cap detector 67 is applied as one input to an AND gate 123, its other input being connected to the output of the one shot 191. The output of the AND gate sets a flip-flop 125. The flip-flop 125 is reset by an inverted signal from the cap detector 67. The flip-flop 125 emits an output signal indicated in FIG. 9(F) which is applied to a second input of the OR gate 111 and which also lights, through appropriate driving circuits, a cap fail light 81. Thus, if a given bottle either has insufficient material in it or if it is missing a cap, the bottle is rejected and pushed aside.

Many variations and other detailed circuit implementations of the circuit of FIG. 8 will become apparent to those skilled in the art. For instance, the bottle detector 59 could be omitted completely if additional circuitry were provided to receive the output of the fill detector 65 in order to determine when a bottle was in the detecting station or not. Also, instead of counting and keeping track of those samples wherein no particulate material is present in the beam 63, the reverse could be accomplished; that is, the samples where particulate material is present could be counted upon substituting an up counter for the down counter 95 and changing the polarity of the signal applied in the line 101 to the AND gate 99. However, the existing circuit of FIG. 8 is advantageous for carrying out the main purpose of the instrument. In any event, what is being detected is the proportion of samples wherein particulate material exists and where it does not, the total of which must equal the total number of samples taken while a given bottle is within the detecting station in the path of the bottle detecting beam 57. It will also be recognized that the techniques described herein could be adapted to detect when a bottle contained too much material, rather than an insufficient amount. In this alternative case, a bottle would be rejected if the number of samples showing particulate material existing exceeded a certain amount.

The embodiment described with respect to the drawings passes a beam of radiation through the container to detect the existence of material. However, it should be recognized that a reflective technique may alternatively be employed. For such a variation, the radiation is chosen to penetrate the container, as before, but is also chosen to be of a type reflected from the material inside the container. The radiation source 61 and detector 65 would then be placed on the same side of the container 17. The output of the detector 65 would be inverted in polarity since it is desired to decrement the counter 95, in this specific example, during each sample wherein no reflection is received by the detector because of the absence of material within the container 17. Except for the repositioning of the radiation source 61 and detector 65, and inverting the output of the detector 65, the reflective technique can be implemented in an apparatus exactly like that described with respect to the drawings in every other respect. In addition, it should be noted that the bottle detector 59 and light source 55 can be oriented to operate on reflected radiation as well, the output of the detector 59 being inverted from that shown in FIG. 8 if reflective radiation is utilized.

A single detector 65 has been described in a preferred embodiment but it should be understood that an array of detectors could be substituted therefor and oriented in a vertical direction. The radiation beam 63 would then be designed to flood the entire array of detectors. The existence or absence of material at the level of each of the individual detectors could be separately kept track of by the use of registers, counters, and the like, or the existence or non-existence of radiation falling on them could be integrated to develop a single signal which would be used in the circuit of FIG. 8. If the output of each detector and array is separately kept track of, however, there is an advantage of being able to easily detect an overfill condition, as well as an underfill condition, at the same time.

Alternatively, an array of detectors could be oriented horizontally and their outputs scanned while a container is in front of the array, such scanning taking the place of relative motion between the container and the detectors in a direction along the surface of the array.

Therefore, although the various aspects of the present invention have been described with respect to a very specific instrument embodiment thereof, it will be understood that the invention is entitled to protection within the full scope of the appended claims.

I claim:

1. A method of measuring the level of particulate material in a container, comprising the steps of:
    scanning a beam of radiation across to the container at a desired fill level, said radiation being of a type that is heavily attenuated by said particulate material but which is able to penetrate the container,
    detecting the intensity of the radiation beam after passing through the container,
    determining the proportion of the radiation beam scan across the container wherein the radiation beam is attenuated or unattenuated by material therein, and
    comparing said proportion with a predetermined threshold proportion, whereby it is determined whether the amount of particulate material in the container falls within acceptable limits.

2. A method of measuring the level of opaque particulate material in a transparent container, comprising the steps of:
    scanning an electromagnetic beam of visible or near visible radiation across to the container at a desired fill level,
    detecting the intensity of the radiation beam after passing through the container,
    periodically sampling during said scan the detected intensity of the radiation beam to determine at those intervals whether or not the beam is being absorbed by said particulate matter within the container, and
    determining from the relative number of unblocked and blocked radiation beam samples whether or not there is a correct amount of particulate material within the container.

3. A method of measuring the level of opaque particulate material within a light transparent container, comprising the steps of:
    moving a spaced apart line of containers one at a time through a detection station,
    directing a beam of visible or near visible radiation across the path of said containers at said detection station and at a level of the desired fill height of the particulate material therein,
    detecting the intensity of the radiation beam after passing across the path of said containers,
    determining when the container is within the detection station in the path of said radiation beam,
    detecting the intensity of the radiation beam on the opposite side of the container path, whereby it can be detected while a container is moving through the beam whether particulate material is above the desired fill line where the light is blocked or below the fill line where light passes through the container to the detector, and
    determining during the time the container is in the path of said radiation beam the proportion of the distance across the container in its direction of travel wherein the particulate material is below or above said desired fill height level.

4. The method according to claim 3 wherein the step of determining the proportional distances comprises the steps of:
    sampling the radiation beam at periodic intervals as the container passes therethrough,
    counting the number of such samples wherein the radiation beam is not blocked during the time the container is in the path of said radiation beam, and
    comparing said number with a previously set threshold number, wherein if said number is above said threshold the container is to be rejected.

5. The method according to claim 4 which comprises an additional step of removing a container from the line of containers after it has left the detection station if the container is to be rejected.

6. A system for measuring the level of particulate material within a container, comprising the steps of:
    means for moving a line of containers through a detection station,
    means for generating a radiation beam across said path at a level thereabove at a desired top fill level of the particulate material within the container,
    means for detecting when the container first enters and leaves the path of the radiation beam,
    means responsive to said detecting means for sampling at periodic intervals while the container is within the beam the intensity of the radiation beam that passes through the container, whereby samples are obtained across the container as to whether the particulate matter is above or below the desired top fill level, and
    means responsive to said sampling means for comparing the relative numbers of samples at the different states with set threshold values, whereby it is determined whether the fill level of the particulate material is satisfactory.

7. A system according to claim 6 which additionally comprises means responsive to said counting means for moving a container out of the stream of containers when its fill level is determined not to meet desired fill level criteria.

8. A system according to claim 6 wherein said bottle detecting means includes a second radiation beam at the detecting station passed across the path of the containers.

9. The system according to claim 6 wherein said sampling means includes a binary counter preset to have a predetermined number of counts prior to an overflow signal occurring, said overflow signal being an indication of the actual fill height compared to the desired fill height.

10. A system according to any of claims 6, 7, 8 and 9 wherein said radiation beam is electromagnetic energy within the visible or near visible spectrum.

11. The system according to any of claims 6, 7, 8 and 9 which additionally comprises means within said detecting station above the path of the containers for determining whether the tops of the containers are covered.

12. A method of measuring the level of particulate material in a container, comprising the steps of:
scanning a beam of radiation relative to the container at a desired fill level, said radiation being of a type that is significantly altered by said particulate material but which is able to penetrate the container,
detecting the intensity of the radiation beam after passing into space within the container that can be occupied by the material,
determining the proportion of the radiation beam scan across the container wherein the radiation beam is altered or unaltered by material therein, and
comparing said proportion with a predetermined threshold proportion, whereby it is determined whether the amount of particulate material in the container falls within acceptable limits.

13. A method of measuring the level of particulate material in a container, comprising the steps of:
scanning a beam of radiation relative to the container at a desired fill level, said radiation being of a type that is reflected by said particulate material but which is able to penetrate the container,
detecting the intensity of the radiation beam at a position wherein the beam's reflection from material will occur,
determining the proportion of the radiation beam scan across the container wherein the radiation beam is reflected or unreflected by material therein, and
comparing said proportion with a predetermined threshold proportion, whereby it is determined whether the amount of particulate material in the container falls within acceptable limits.

14. A method of measuring the level of particulate material in a container held upright comprising the steps of:
scanning a narrow beam of radiation only substantially horizontally across the container at a desired fill level, said radiation being of a type that is heavily attenuated by said particulate material but which is able to penetrate the container,
detecting the intensity of the radiation beam during the scan across the container after it passes through the container,
determining the proportion of the radiation beam scan across the container wherein the radiation beam is attenuated or unattenuated by particulate material therein,
comparing said proportion with a predetermined threshold proportion, whereby it is determined whether the amount of particulate material in the container falls within acceptable limits, and
rejecting the container if the proportion wherein the radiation beam is attenuated or unattenuated by particulate material in the container falls below or exceeds, respectively, said threshold proportion.

15. A system for measuring the level of particulate material within a container, comprising:
means for moving a line of containers through a detection station,
means for directing a radiation beam across said path at a pre-set level thereabove coincident with a desired top fill level of the particulate material within the container, said radiation being of a type that is heavily attenuated by said particulate material but which is able to penetrate the container,
means for detecting when the container first enters and leaves the path of the radiation beam,
means responsive to said detecting means for sampling at periodic intervals while the container is within the beam the intensity of the radiation beam that passes through the container, whereby samples are obtained across the container as to whether the particulate matter is above or below the desired top fill level,
means responsive to said sampling means for comparing the relative numbers of samples at the different states with set threshold values, whereby it is determined whether the fill level of the particulate material is satisfactory, and
means responsive to said sampling means for rejecting a container when the number of said samples showing the level of particulate material to be less than or more than said desired top fill level exceeds or falls below, respectively, said set threshold amount.

* * * * *